United States Patent
Lee

(10) Patent No.: US 9,250,478 B2
(45) Date of Patent: Feb. 2, 2016

(54) SEALANT COATING EQUIPMENT FOR LIQUID CRYSTAL PANEL AND ITS COATING METHOD

(75) Inventor: Chien-pang Lee, Shenzhen (CN)

(73) Assignee: SHENZHEN CHINA STAR OPTOELECTRONICS TECHNOLOGY CO., LTD, Guangdong (CN)

( * ) Notice: Subject to any disclaimer, the term of this patent is extended or adjusted under 35 U.S.C. 154(b) by 449 days.

(21) Appl. No.: 13/375,439

(22) PCT Filed: Oct. 26, 2011

(86) PCT No.: PCT/CN2011/081308
§ 371 (c)(1),
(2), (4) Date: Nov. 30, 2011

(87) PCT Pub. No.: WO2013/053150
PCT Pub. Date: Apr. 18, 2013

(65) Prior Publication Data
US 2013/0095231 A1    Apr. 18, 2013

(30) Foreign Application Priority Data
Oct. 14, 2011  (CN) .......................... 2011 1 0313162

(51) Int. Cl.
*G02F 1/1339* (2006.01)
*B05C 11/10* (2006.01)
*B05D 1/26* (2006.01)
*B05C 5/02* (2006.01)
*G02F 1/13* (2006.01)

(52) U.S. Cl.
CPC ............ *G02F 1/1339* (2013.01); *B05C 5/0216* (2013.01); *B05C 11/1005* (2013.01); *B05C 5/0204* (2013.01); *B05D 1/26* (2013.01); *G02F 1/1309* (2013.01)

(58) Field of Classification Search
None
See application file for complete search history.

(56) References Cited

U.S. PATENT DOCUMENTS

| 4,899,296 A * | 2/1990 | Khattak .......................... 702/40 |
| 2002/0176928 A1* | 11/2002 | Minami et al. .................... 427/8 |
| 2004/0090589 A1* | 5/2004 | Jung et al. ..................... 349/187 |

* cited by examiner

*Primary Examiner* — Timothy Meeks
*Assistant Examiner* — Michael P Rodriguez

(57) ABSTRACT

The present invention discloses a sealant coating equipment of a liquid crystal panel which comprises a nozzle, the nozzle is used for sealant coating of substrates required to be sealant-coated, the equipment further comprises a monitoring and detecting device. When the nozzle is performing sealant coating, the monitoring and detecting device is used for instantaneously acquiring images after the sealant coating is performed by the nozzle, determining if there are defects of sealant coating according to the acquired images, and recording location data of defective sealant coatings when determining that there are the defective sealant coatings. When the nozzle finishes the sealant coating, the monitoring and detecting device is further used for displaying images of the defective sealant coatings and locations data of the defective sealant coatings. The present invention further discloses a sealant coating method of a liquid crystal panel.

3 Claims, 4 Drawing Sheets

SEALANT COATING EQUIPMENT FOR LIQUID CRYSTAL PANEL AND ITS COATING METHOD

BACKGROUND OF THE INVENTION

1. Field of Invention

The present invention relates to a field of liquid crystal display technology and more particularly to a sealant coating equipment and its coating method for a liquid crystal panel.

2. Related Art

In a sealant coating process for glass substrate in production of liquid crystal display, after sealant is coated and formed on glass substrate in an airtight coating box, it is then inspected by a sealant inspection machine, any defect of sealant coating found will be regarded as disqualified sealant coated product, such products have to be mended, for example, defective areas of sealant coating have to be patched up with sealant.

In existing techniques, patch up of sealant is commonly carried out with the following two methods:

firstly, purchasing a sealant inspection machine and an airtight coating box, inspection is performed with the purchased sealant inspection machine, when disqualified sealant coated products are found, patching up of sealant is carried out in the airtight coating box;

secondly, disqualified sealant coated products are moved back reversely by manpower to the original airtight coating box for patching up of sealant.

If purchasing the sealant inspection machine and airtight coating box, it will definitely increase the costs. If disqualified sealant coated products are moved back reversely by manpower to the original airtight coating box for patching up of sealant, production capacity of an entire sealant coating line will be affected; furthermore, if cracks or similar defects are found in sealant, it will be ineffective for patch up of sealant once a long period has passed since the defects are found.

Therefore, in order to ensure an effect of patching up of sealant, defects of sealant coating in sealant coating process have to be patched up timely. However, basically in existing techniques, after the substrates are coated with sealant, they are inspected in a stationary manner by locations if there are defects of sealant coating. Apparently, it is time-wasting if inspection is carried out with this method, and efficiency of patching up of sealant is reduced to a great extent, therefore production capacity of coating of sealant will be reduced as well.

SUMMARY OF THE INVENTION

An object of the present invention is to provide a sealant coating equipment for a liquid crystal panel to solve the technical problems of reduced efficiency of patching up of sealant and reduced production capacity of coating of sealant caused by stationary inspection by locations to find out if there are defects of sealant coating after the substrates are coated with sealant in existing techniques.

In order to solve the abovementioned problems, the present invention provides a sealant coating equipment for a liquid crystal panel, it comprises a nozzle, the nozzle is used for sealant coating of a substrate which requires to be sealant coated, the equipment further comprises a monitoring and detecting device correspondingly connected with the nozzle, and is disposed with the nozzle according to a predetermined angle;

wherein when the nozzle is performing sealant coating, the monitoring and detecting device is used for instantaneously acquiring images after the sealant coating is performed by the nozzle, and comparing acquired images with pre-stored standard images, in order to determine if there are defects of sealant coating, and record location data of the defective sealant coating when determining that there is the defective sealant coating; and wherein when the nozzle finishes the sealant coating, the monitoring and detecting device is further used for displaying images of the defective sealant coating and location data of the defective sealant coating.

In the sealant coating equipment for the liquid crystal panel of the present invention, the monitoring and detecting device is further pre-stored with control data; the monitoring and detecting device acquires images after the sealant coating is performed by the nozzle according to the control data.

In the sealant coating equipment for the liquid crystal panel of the present invention, the control data includes: a moving speed, an image reading view and an image acquiring frequency of an image acquiring unit.

In the sealant coating equipment for the liquid crystal panel of the present invention, the monitoring and detecting device comprises:

an image acquiring unit instantaneously acquiring images after the sealant coating is performed by the nozzle;

an image processing unit determining if there are the defects of the sealant coating, and recording the location data of the defective sealant coating when determining that there is the defective sealant coating; and a control and display unit pre-storing the control data, and displaying the images of the defective sealant coating and the location data of the defective sealant coating.

Another object of the present invention is to provide a sealant coating equipment for a liquid crystal panel to solve the technical problems of reduced efficiency of patching up of sealant and reduced production capacity of coating of sealant caused by stationary inspection by locations to find out if there are defects of sealant coating after the substrates are coated with sealant in existing techniques.

In order to solve the abovementioned problems, the present invention provides a sealant coating equipment for a liquid crystal panel, it comprises a nozzle, the nozzle is used for sealant coating of a substrate which requires to be sealant coated, the equipment further comprises a monitoring and detecting device;

wherein when the nozzle is performing the sealant coating, the monitoring and detecting device is used for instantaneously acquiring images after the sealant coating is performed by the nozzle, and determining if there are defects of sealant coating according to the acquired images, and recording location data of the defective sealant coating when determining that there is the defective sealant coating; and wherein when the nozzle finishes the sealant coating, the monitoring and detecting device is further used for displaying images of the defective sealant coating and location data of the defective sealant coating.

In the sealant coating equipment for the liquid crystal panel of the present invention, the monitoring and detecting device is further pre-stored with control data; the monitoring and detecting device acquires images after the sealant coating is performed by the nozzle according to the control data.

In the sealant coating equipment for the liquid crystal panel of the present invention, the control data includes: a moving speed, an image reading view and an image acquiring frequency of an image acquiring unit.

In the sealant coating equipment for the liquid crystal panel of the present invention, the monitoring and detecting device is correspondingly connected with the nozzle, and is disposed with the nozzle according to a predetermined angle.

In the sealant coating equipment for the liquid crystal panel of the present invention, the monitoring and detecting device comprises:

an image acquiring unit instantaneously acquiring images after the sealant coating is performed by the nozzle;

an image processing unit determining if there are the defects of the sealant coating, and recording the location data of the defective sealant coating when determining that there is the defective sealant coating; and a control and display unit pre-storing the control data, and displaying the images of the defective sealant coating and the location data of the defective sealant coating.

In the sealant coating equipment for the liquid crystal panel of the present invention, the monitoring and detecting device compares acquired images with pre-stored standard images, in order to determine if there are defects of the sealant coating.

Yet another object of the present invention is to provide a sealant coating method for a liquid crystal panel to solve the technical problems of reduced efficiency of patching up of sealant and reduced production capacity of coating of sealant caused by stationary inspection by locations to find out if there are defects of sealant coating after the substrates are coated with sealant in existing techniques.

In order to solve the abovementioned problems, the present invention provides a sealant coating method for a liquid crystal panel, the method includes following steps of:

providing a sealant coating equipment and a substrate requires to be sealant-coated, the sealant coating equipment comprises a nozzle and a monitoring and detecting device;

coating a sealant onto the substrate by the nozzle;

instantaneously acquiring images after the sealant coating is performed by the nozzle via the monitoring and detecting device;

determining if there is defective sealant coating by the monitoring and detecting device; and recording location data of the defective sealant coating by the monitoring and detecting device when determining that there are the defective sealant coatings; and displaying the defective sealant coating images and the data of the defective sealant coating locations by the monitoring and detecting device when the nozzle finishes the sealant coating.

In the sealant coating method for the liquid crystal panel of the present invention, before the step of instantaneously acquiring images after the sealant coating is performed by the nozzle via the monitoring and detecting device, the method further includes following steps of:

storing of control data by the monitoring and detecting device;

acquiring images after the sealant coating is performed by the nozzle according to the control data via the monitoring and detecting device; wherein the control data includes: a moving speed, an image reading view and an image acquiring frequency of an image acquiring unit.

In the sealant coating method for the liquid crystal panel of the present invention, the monitoring and detecting device includes an image acquiring unit, an image processing unit and a control and display unit, wherein the monitoring and detecting device acquires images after the sealant coating is performed by the nozzle via the image acquiring unit;

the monitoring and detecting device determines if there are the defects of the sealant coating, and records location data of the defective sealant coating when determining that there is the defective sealant coating; and the monitoring and detecting device pre-stores the control data, and displays the images of the defective sealant coating and the location data of the defective sealant coating via the control and display unit.

In the sealant coating method for the liquid crystal panel of the present invention, the step of determining if there are the defects of the sealant coating by the monitoring and detecting device includes a step of:

comparing the acquired images with pre-stored standard images by the monitoring and detecting device, in order to determine if there are the defects of the sealant coating.

In the sealant coating method for the liquid crystal panel of the present invention, Comparing with existing techniques, the present invention solves the technical problem of reduced efficiency of patching up of sealant caused by stationary inspection by locations to find out if there are defects of sealant coating after the substrates are coated with sealant, and enhances the production capacity.

The structure and the technical means adopted by the present invention to achieve the above and other objects can be best understood by referring to the following detailed description of the preferred embodiment and the accompanying drawings, but should not be construed as limitations thereof.

DETAILED DESCRIPTION OF THE INVENTION

The following description of the preferred embodiments is referring to the accompanying drawings to exemplify specific practicable embodiments of the present invention.

Figure 1:
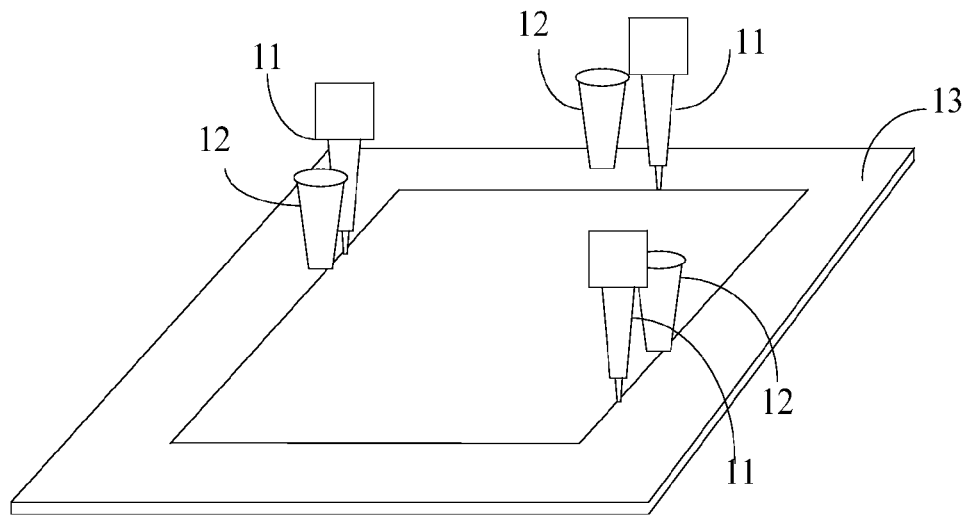
FIG. 1 is an illustration of a structure of a sealant coating equipment of a liquid crystal panel of a preferred embodiment according to the present invention.

FIG. 1 is an illustration of a structure of a sealant coating equipment of a liquid crystal panel of a preferred embodiment according to the present invention.

Referring to FIG. 1, the sealant coating equipment of a liquid crystal panel comprises a nozzle 11 and a monitoring and detecting device 12, wherein the nozzle 11 is used for sealant coating of a substrate 13 required to be coated with sealant.

When the nozzle 11 performs sealant coating, the monitoring and detecting device 12 acquires images instantaneously after the sealant coating is performed by the nozzle 11, and determines if there are defects of sealant coating. If defective sealant coating is found, the monitoring and detecting device 12 records location data of the defective sealant coating. After the nozzle 11 finishes the sealant coating, the monitoring and detecting device 12 displays the defective sealant coating images and the data of the defective sealant coating locations, so that inspectors can conveniently patch up the defective sealant coating in a timely and speedy manner.

In this embodiment, the monitoring and detecting device 12 is pre-stored with standard images, the monitoring and detecting device 12 compares the instantaneously acquired images with pre-stored standard images, in order to determine if there are defects of sealant coating. Certainly, defects of sealant coating can also be determined by other methods which will not be mentioned herein one by one.

Figure 2A:
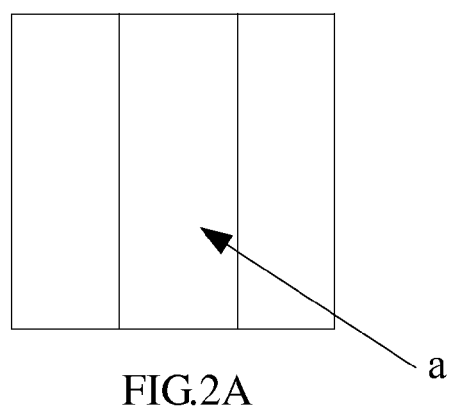
FIGS. 2A to 2C are illustrations of determining of acquired images according to the present invention.
Figure 2B:
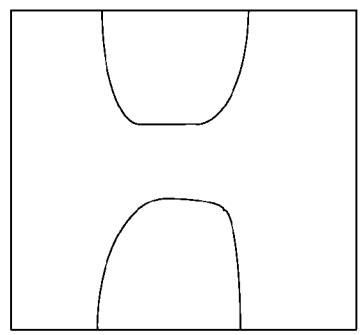
Figure 2C:
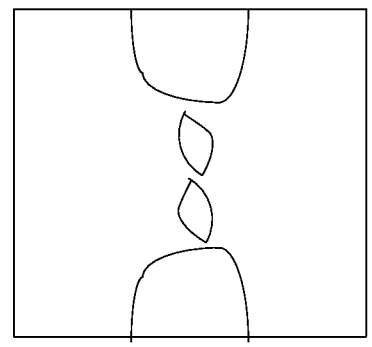

Referring to FIGS. 2A to 2C, FIG. 2A is a standard image, an area "a" is an image of non-defective sealant coating after being coated with sealant, FIGS. 2B and 2C are images of defective sealant coating. Comparing with a standard image in FIG. 2A, the defective sealant coating shown in FIG. 2B is formed due to a crack, while the defective sealant coating shown in FIG. 2C is formed due to linear discontinuity.

In an embodied process, location data of defective sealant coating are coordinates of the substrate 13, they can also be other location data, provided that inspectors can accurately locate defective sealant coating.

In an embodied process, the monitoring and detecting device 12 is further pre-stored with control data, and acquires images after the sealant coating is performed by the nozzle 11 according to the control data. Preferably, the control data includes a moving speed, a view image reading and an image acquiring frequency of the monitoring and detecting device 12.

For example, the moving speed of the monitoring and detecting device 12 is 200 mm/s, the image reading view of the monitoring and detecting device 12 is 5 mm, and the image acquiring frequency of the monitoring and detecting device 12 is 60 fps.

In this embodiment, the moving speed of the monitoring and detecting device 12 is the same as that of the nozzle 11, in order to ensure that the monitoring and detecting device 12 can instantaneously acquire images after sealant coating is performed by the nozzle 11.

Figure 3A:
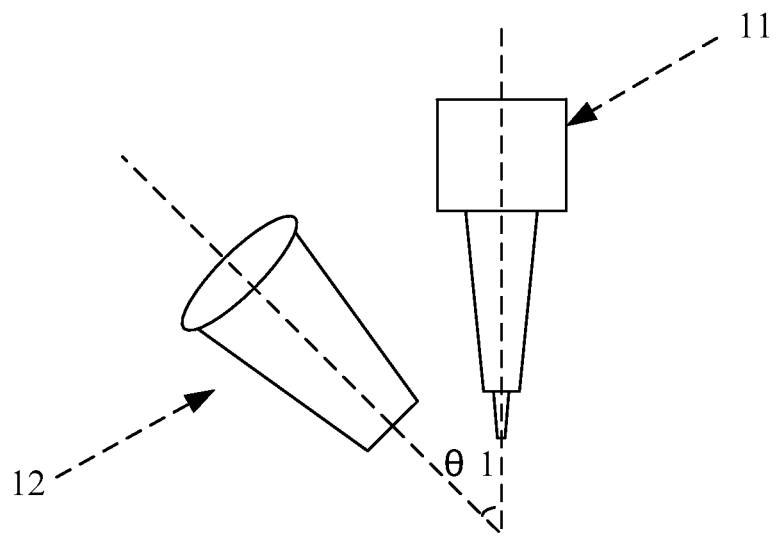
FIGS. 3A and 3B are illustrations of disposition angles of a monitoring and detecting device as well as a nozzle according to the present invention.
Figure 3B:
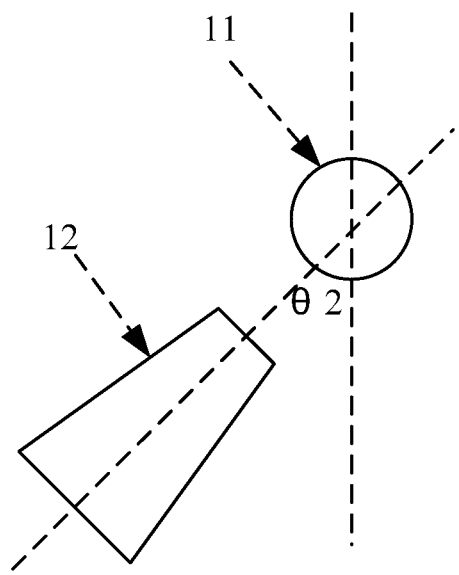

In this embodiment, the monitoring and detecting device 12 is connected correspondingly with the nozzle 11, the monitoring and detecting device 12 as well as the nozzle 11 are disposed according to a predetermined angle. Referring to FIGS. 3A and 3B, the predetermined angle include a vertically set first preset angle θ1 (FIG. 3A), and a horizontally set second preset angle θ2 (FIG. 3B). The first preset angle θ1 and the second preset angle θ2 are set with degrees so that the monitoring and detecting device 12 can acquire all images after the sealant coating is performed by the nozzle 11.

Figure 4:
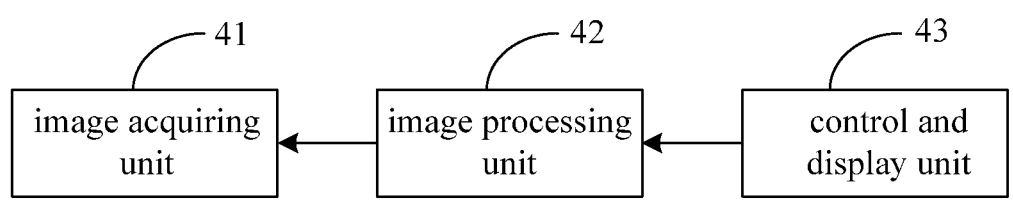
FIG. 4 is an internal structural illustration of a monitoring and detecting device according to the present invention.

Referring to FIG. 4, it is an internal structural illustration of the monitoring and detecting device according to the present invention, wherein it includes an image acquiring unit 41, an image processing unit 42 and a control and display unit 43.

Wherein the image acquiring unit 41 is used for instantaneously acquiring images after the sealant coating is performed by the nozzle 11;

the image processing unit 42 is used for determining if there are defects of sealant coating according to the images acquired by the image acquiring unit 41, and recording location data of the defective sealant coating when determining that there is the defective sealant coating; and the control and display unit 43 is used for pre-storing the control data, and displaying images of the defective sealant coating and location data of the defective sealant coating, so that inspectors can patch up the defective sealant coating accurately in a timely manner.

An operational principle of a sealant coating equipment of a liquid crystal panel provided by the embodiment is:

The nozzle 11 performs sealant coating for the substrate 13, wherein a moving speed of the nozzle 11 is 200 mm/s, the monitoring and detecting device 12 corresponding to the nozzle 11 also moves on the same track of the nozzle 11 at a moving speed of 200 mm/s.

Furthermore, the monitoring and detecting device 12 acquires images after the sealant coating is performed by the nozzle 11 at a frequency of 60 fps, and compares the acquired images with pre-stored standard images in the monitoring and detecting device 12, in order to determine if there are defects of sealant coating.

Once defective sealant coating is found, the monitoring and detecting device 12 records location data of the defective sealant coating, after the nozzle 11 finishes the sealant coating, the monitoring and detecting device 12 displays images of the defective sealant coating and the location data of the defective sealant coating to inspectors, so that the inspectors can patch up the defective sealant coating accurately in a timely manner.

Figure 5:
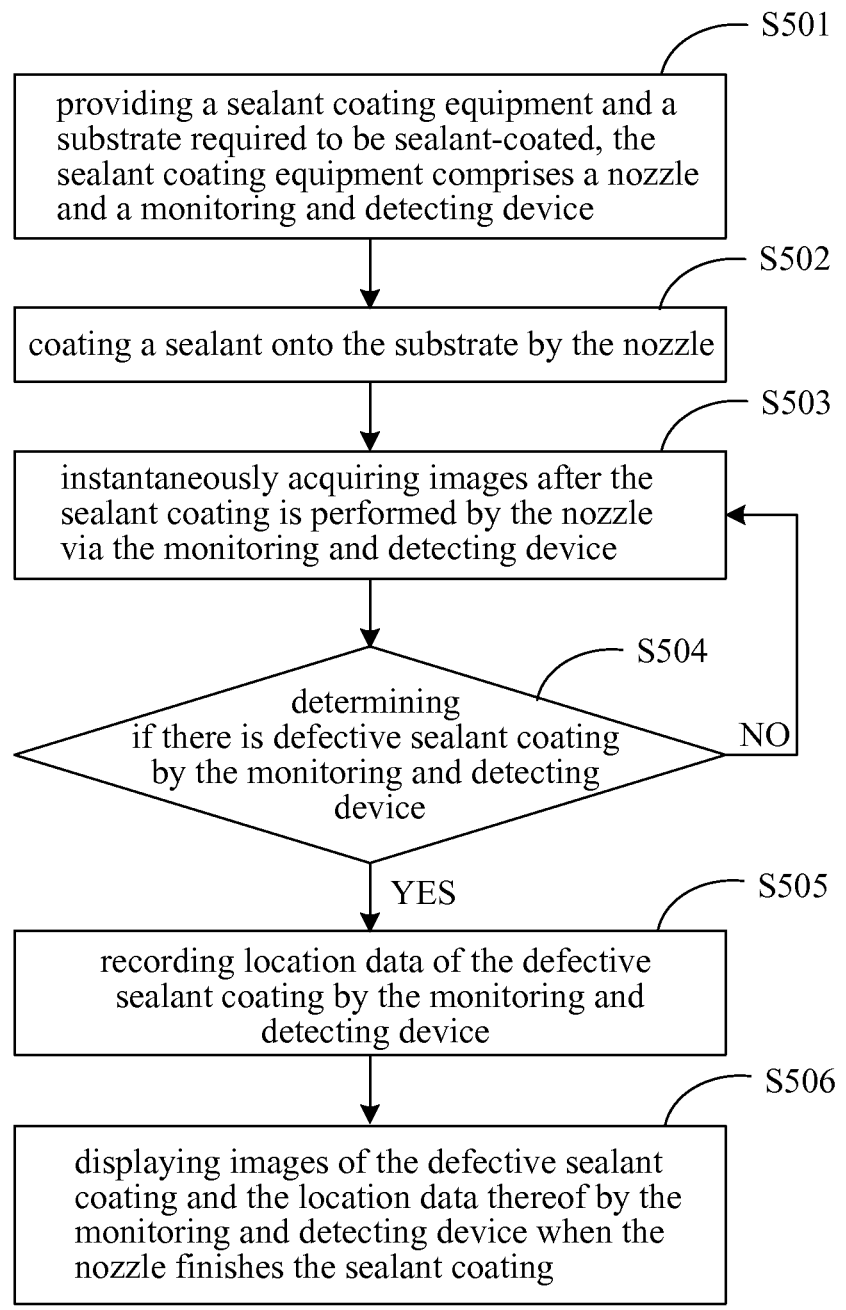
FIG. 5 is a flowchart of a sealant coating method of a liquid crystal panel of the present invention.

The present invention further provides a sealant coating method of a liquid crystal panel, please refer to FIG. 5.

In a step S501, providing a sealant coating equipment and a substrate required to be sealant coated, the sealant coating equipment comprises a nozzle and a monitoring and detecting device.

In an embodied process, the monitoring and detecting device is correspondingly connected with the nozzle, and is disposed according to a predetermined angle, and please refer to the abovementioned context for specific descriptions which will not be repeated herein again.

In a step S502, coating a sealant onto the substrate by the nozzle.

In a step S503, acquiring images instantaneously after the sealant coating is performed by the nozzle via the monitoring and detecting device disposed corresponding to the nozzle.

In an embodied process, the monitoring and detecting device is further pre-stored with control data, and acquires images after the sealant coating is performed by the nozzle according to the control data.

Preferably, the control data includes a moving speed, a view of image reading and an image acquiring frequency of the image acquiring unit, as described specifically in the abovementioned context.

In a step S504, determining if there is defective sealant coating by the monitoring and detecting device, if found, proceeding to a step S505; or if not found, continuing with the step S503.

Preferably, in this embodiment, by pre-storing standard images in the monitoring and detecting device, the monitoring and detecting device compares the instantaneously acquired images with pre-stored standard images, for determining if there are defects of sealant coating. Certainly, defects of sealant coating can also be determined by other methods which will not be mentioned herein one by one.

In the step S505, recording location data of the defective sealant coating by the monitoring and detecting device.

In a step S506, when the nozzle finishes the sealant coating, displaying the defective sealant coating images and the data of the defective sealant coating locations by the monitoring and detecting device.

In an embodied process, the monitoring and detecting device includes an image acquiring unit, an image processing unit and a control and display unit:

The monitoring and detecting device acquires images after the sealant coating is performed by the nozzle via the image acquiring unit; the monitoring and detecting device determines if there are defects of sealant coating, and records location data of the defective sealant coating when defective sealant coating is found via the image processing unit; the monitoring and detecting device pre-stores the control data, and displays the defective sealant coating images and the data of the defective sealant coating locations via the control and display unit.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A sealant coating method of a liquid crystal panel, characterized in that: the method comprises following steps of:
   providing a sealant coating equipment and a liquid crystal panel substrate required to be sealant-coated, the sealant coating equipment comprises a nozzle and a monitoring and detecting device, wherein the monitoring and detecting device is correspondingly connected with the nozzle, and is disposed with the nozzle according to a predetermined angle, wherein the predetermined angle includes a vertically set first preset inclined angle $\theta 1$, and a horizontally set second preset inclined angle $\theta 2$, wherein each of $\theta 1$ and $\theta 2$ is less than 90 degrees;
   coating a sealant onto the liquid crystal panel substrate by the nozzle to form a sealant coating;
   instantaneously acquiring images via the monitoring and detecting device while coating the sealant by the nozzle;
   determining defects in the sealant coating by the monitoring and detecting device;
   after determining the defects in the sealant coating, recording location data of the defects by the monitoring and detecting device; and
   after recording the location data of the defects, displaying images of the defects in the sealant coating and the location data of the defects by the monitoring and detecting device when the nozzle finishes coating the sealant;
   wherein the step of determining the defects in the sealant coating by the monitoring and detecting device includes a step of:
   comparing the acquired images with pre-stored standard images by the monitoring and detecting device.

2. The sealant coating method of a liquid crystal panel as claimed in claim 1, characterized in that: before the step of instantaneously acquiring images via the monitoring and detecting device while coating the sealant by the nozzle, the method further includes following steps of:
   storing of control data by the monitoring and detecting device;
   wherein the images are acquired according to the control data including a moving speed, an image reading view and an image acquiring frequency of an image acquiring unit.

3. The sealant coating method of a liquid crystal panel as claimed in claim 2, characterized in that: the monitoring and detecting device includes the image acquiring unit, an image processing unit and a control and display unit, wherein
   the images are acquired by the image acquiring unit while coating the sealant by the nozzle;
   the defects in the sealant coating are determined by the image processing unit, and the location data of the defects in the sealant coating is recorded by the image processing unit; and
   the control data is pre-stored by the control and display unit, and the images of the defects in the sealant coating and the location data of the defects are displayed by the control and display unit.

* * * * *